United States Patent [19]
Williams

[11] 3,991,165
[45] Nov. 9, 1976

[54] PROCESS FOR THE PURIFICATION OF PHOSPHORIC ACID USING AMINES

[75] Inventor: Kenneth A. Williams, Diamond Bar, Calif.

[73] Assignee: Occidental Petroleum Corporation, Los Angeles, Calif.

[22] Filed: Nov. 26, 1975

[21] Appl. No.: 635,460

Related U.S. Application Data

[63] Continuation of Ser. No. 371,585, June 23, 1973, abandoned, which is a continuation-in-part of Ser. No. 85,760, Oct. 30, 1970, abandoned.

[52] U.S. Cl. ............................................. 423/321 S
[51] Int. Cl.² ......................................... C01B 25/16
[58] Field of Search ......... 473/319, 370, 371, 321 S

[56] References Cited
UNITED STATES PATENTS

| | | | |
|---|---|---|---|
| 3,310,374 | 3/1967 | Posey et al. | 423/321 |
| 3,333,924 | 8/1967 | Hazen et al. | 423/321 |
| 3,361,527 | 1/1968 | Hinkebein et al. | 423/321 |
| 3,367,749 | 2/1968 | Koerner et al. | 423/321 |
| 3,479,139 | 11/1969 | Koerner | 423/321 |

*Primary Examiner*—Oscar R. Vertiz
*Assistant Examiner*—Eugene T. Wheelock
*Attorney, Agent, or Firm*—William G. Lane; Edward A. Grannen, Jr.

[57] ABSTRACT

A water immiscible amine-solvent system, preferably a solution of a water immiscible amine in mineral spirit solvent, is used to extract phosphate values from crude aqueous phosphoric acid solutions leaving behind impurities, e.g., calcium, magnesium, iron and aluminum. Phosphoric acid of water white quality may then be produced and removed from the amine-solvent organic phase by contacting the amine-solvent containing the extracted phosphate values with sulfur dioxide and water substantially in the absence of oxygen, the amount of water employed determining the concentration of phosphoric acid produced, thermally stripping the sulfur dioxide from the amine-solvent system substantially in the absence of oxygen in order to recycle both the amine-solvent system and sulfur dioxide.

20 Claims, No Drawings

PROCESS FOR THE PURIFICATION OF PHOSPHORIC ACID USING AMINES

This is a continuation of application Ser. No. 371,585 filed June 23, 1973, now abandoned, which is a continuation-in-part of my application Ser. No. 85,760 filed Oct. 30, 1970, now abandoned.

BACKGROUND OF THE INVENTION

The present invention relates to a process for the production of high purity phosphoric acid from crude phosphoric acid solutions such as those produced in a wet process phosphoric acid industry.

If the acid is to be used to produce super phosphoric acid and further to be used for making liquid fertilizers such as 10–34– or 11–37–0, etc. it is essential that the magnesium content of the acid be low. This is because a high MgO content in the super phosphoric acid will cause a gel to form during the preparation of the mixed fertilizer and it will maintain its storage ability. Further, these impurities cause equipment clogging when it is attempted to disperse them in the normal course of their use.

The phosphoric acid produced by conventional leaching operations contains solids and is normally brown or black in color due to the presence of organics or green if the organic colorants are in some way eliminated from the acid such as by prior calcination of the ores. When it is attempted to concentrate the acid from its normal production level of 30 percent $P_2O_5$ to 40 or 54 percent $P_2O_5$, a considerable amount of calcium sulfate, and other solids are generated in the form of sludge. To make some use of the sludge, the contained aluminum and iron phosphates may be fed to solid fertilizer plants making diammonium phosphate and triple super phosphate. The quantity of this sludge, however, may be in excess of market demand for those products. This can, therefore, place limits on a wet process plant from both a capacity and balance of products standpoint.

Even though the sludges are removed, wet process phosphoric acid still contains considerable impurities which scale process equipment and continue to precipitate from the acid during storage and shipment. In addition, a considerable amount of the fluoride which was present in the rock appears in the acid. If the acid is to be used for the production of animal feeds, the fluoride must, in some way, be removed and this represents a costly additional operation, along with a fluoride pollution problem.

U.S. Pat. No. 3,367,749, entitled "Purifying Phosphoric Acid Using an Amine Extractant", E. L. Koerner and E. Saunders issued on Feb. 6, 1968 discloses a process whereby aqueous impure wet process phosphoric acid is contacted with an amine-solvent system to extract the phosphoric acid into a tertiary amine-solvent system leaving the objectionable metallic impurities behind in the raffinate thereafter the phosphoric acid contained in the amine-solvent system is removed from this phase by methods which include back extracting with water, a suitable aqueous acidic solution, or a suitable basic solution. This process also provides for regeneration of the extractant phase for recycle in their process. However, the aqueous acidic solutions disclosed in the patented process contemplate the use of strong mineral acids which react with the amine portion of the amine-solvent system and form a salt thereof. To regenerate the amine from the salt thereof a stronger base than the amine is required, i.e., ammonia or stronger. The strong base is reacted with the amine salt resulting from the back extraction, thereby producing the free amine and the mineral acid salt. The mineral acid and the strong base are both consumed rendering additional high costs to the process which do not favor process economics.

The art has been seeking a fully cyclic process wherein raw materials are not consumed.

SUMMARY OF THE INVENTION

It has now been found that high purity, phosphoric acid of waterwhite quality can be econmically produced from phosphate bearing materials, particularly phosphate slimes and low grade ores and phosphate bearing materials from beneficiation processes, by a process which comprises extracting phosphate values from an impure phosphoric acid solution with an amine-solvent system, preferably an amine dissolved in mineral spirits, forming a concentrated phosphoric acid solution by contacting an amine-solvent system containing the extracted phosphate values with sulfur dioxide and water, then thermally regenerating the amine-solvent system and sulfur dioxide substantially in the absence of oxygen for recycle.

The phosphoric acid produced by this invention may be water white and generally contains up to 30 percent or more by weight $P_2O_5$ depending upon the amount of water and $SO_2$ used to extract the phosphate values from the amine-solvent system. This acid can be concentrated to as high as 80 percent $P_2O_5$ with the formation of a high concentration of polyphosphates, but without the formation of sludges, residues or an adverse increase in viscosity.

The present invention comprises the steps of taking wet phosphoric acid and treating it with an amine organic solvent system wherein the $P_2O_5$ values of the wet phosphoric acid are complexed with the amine to form an amine-$P_2O_5$ complex which remains in the organic solvent phase. The organic solvent phase is separated from the aqueous phase and contacted with sulfur dioxide and water to strip the $P_2O_5$ values from the amine. $P_2O_5$ values enter into the aqueous phase to form aqueous phosphoric acid. The sulfur dioxide complexes with the amine to form an amine sulfur dioxiode reaction product which remains in the organic solvent phase. The purified wet phosphoric acid is separated from the organic phase. The organic phase is treated with steam substantially in the absence of oxygen to regenerate the amine organic solvent system and the sulfur dioxide. The gaseous sulfur dioxide is separated from the amine solvent system and recycled back to the stripping step. The amine solvent system is separated from water, if any, and the amine solvent system is recycled back to the extraction step.

DESCRIPTION

According to the present invention there is provided a process for the production of phosphoric acid of high purity from impure aqueous phosphoric acid solutions, particularly dilute acid solutions as obtained by leaching phosphate bearing slimes, low grade phosphate ores and phosphate bearing residues from beneficiation operations, and which may also be used to upgrade the purity and quality of phosphoric acid produced by more conventional means.

The process of this invention is essentially a closed loop process wherein reagents used in the production of purified phosphoric acid are continuously regenerated for reuse and is based on the ability of an amine-solvent to extract phosphate values from crude phosphoric and wet process acid solutions; the ability of sulfur dioxide to exchange with extracted phosphate values in the amine-solvent system in the presence of water to yield concentrated phosphoric acid; and the ability of the amine-solvent system containing sulfur dioxide to be thermally regenerated for reuse. The thermal regeneration of the amine-solvent system containing the sulfur dioxide can be readily accomplished simply by heating the sulfur dioxide containing amine-solvent system at a temperature ranging from between about 85° F to about the boiling point of the solvent substantially in the absence of free oxygen. When lower temperatures are employed sulfur dioxide removal can be advantageously facilitated by maintaining the system to be regenerated under reduced pressure, e.g., 1 MM of mercury.

In a preferred embodiment of this invention, the thermal regeneration is carried out by contacting the sulfur dioxide containing amine-solvent with a heated non-oxidizing gas, i.e., passing a heated gas which is substantially free of oxygen such as vent gas or steam having a temperature of 212° F through the system, with the gas being readily stripped from the system and easily collected for recycle in the process.

This invention, in general, pertains to purifying phosphoric acid by novel extraction methods utilizing an amine preferably dissolved in an organic diluent as an extractant phase to remove phosphoric acid from the phosphoric acid phase as will be more fully discussed hereinafter.

Although the following description is primarily concerned with purifying wet phosphoric acid it should be noted that the instant invention is capable of purifying, in general, any impure phosphoric acid, however, it is especially adaptable to purifying wet phosphoric acid. As used herein "wet" phosphoric acid means phosphoric acid produced by the wet method which essentially entails the acidulation of phosphate rock by the use of acids, such as, sulfuric acid. The phosphate rock raw material can, of course, vary depending on, inter alia, the source from which it is mined and is usually obtained from such deposits as those located in Florida and the western states, such as Idaho. Although the extractant methods of the present invention do not appear to be dependant on the concentration of the wet phosphoric acid, it is preferred, however, that the concentration be within the range of about 1 to about 90 weight percentage of equivalent $H_3PO_4$.

The amines suitable for use in the present invention are, in general, water-insoluble and/or capable of forming desired water-insoluble salts. Primary, secondary or tertiary amines can be used in the present process.

The primary amines which may be used in the practice of the invention are substantially water insoluble but soluble in water-immiscible organic solvents. The hydrocarbon moiety of the primary amines contain at least 7, and preferably from about 7 to about 25 carbon atoms. The hydrocarbon moiety can be aliphatic or aromatic in nature. Primary aliphatic branch chained amines containing about 25 carbon atoms are particularly preferred.

Illustrative, but no wise limiting, of the primary amines which may be used in practice of this invention, there may be mentioned octylamine, tert-octylamine, n-decylamine, tetradecylamine, n-hexadecylamine, coco-amine, tert-dodecylamine, octadecylamine, octadecenyl, octadecandrenyl amine, and the like as well as mixtures thereof.

The secondary amines which may be used in the practice of the invention are substantially water insoluble, but soluble in water immiscible organic solvents. The two hydrocarbon moieties of the secondary amines each contain at least 4, and preferably, from about 4 to about 18 carbon atoms. The secondary amines contain no more than 25 carbon atoms. The hydrocarbon moieties can be aliphatic, or aromatic in nature. Typical secondary amines that can be employed in the present invention include di-n-butylamine, di-i-butylamine, di-n-amylamine, di-i-amylamine, di-n-octylamine, d-n-nonylamine and the like.

In particular, tertiary aliphatic amines having three substituent groups, each containing about 7 to about 15 carbon atoms, and including branch chain structures as well as straight chain structures, are quite suitable for use in the present invention. Mixtures of amines are suitable when containing to a predominant extent the foregoing structures. It should be noted that for tertiary aliphatic amines the third substituent group may contain any number of carbon atoms but preferably should not contain over about 15 carbon atoms. Tertiary aliphatic amines containing less than about 7 carbon atoms on each of at least two substituent groups exhibit the undesirable tendency to be water-soluble. Tertiary aliphatic amines containing more than about 15 carbon atoms on each of at least two substituent groups exhibit the undesirable tendency to form salts which are relatively insoluble in the extractant phase.

The term "water-insoluble" as used herein with respect to the amines does not necessarily require insolubility. It merely requires that the material be sufficiently immiscible with the wet phosphoric acid phase to allow physical separation of the liquids into two distinct phases.

The preferred amines useful as extractants are long chain hydrocarbyl amines of the following formula

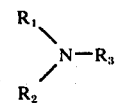

wherein $R_1$ and $R_2$ are members selected from the class consisting of saturated and ethylenically unsaturated aliphatic hydrocarbyl groups containing from about 7 to about 15 carbon atoms and $R_3$ is a member selected from the class consisting of hydrogen, and saturated and ethylenically unsaturated aliphatic hydrocarbyl groups containing from 1 to about 18 carbon atoms.

The following long chain hydrocarbyl amines are representative of suitable extractants for use in the present invention.

di-n-decylamine
$[CH_3(CH_2)_9]_2NH$
tri-n-octylamine
$[CH_3(CH_2)_7]_3N$
methyldioctylamine
$[CH_3(CH_2)_7]_2(CH)N$
dimethyloctyl amine
$[CH_3 (CH_2)_7](CH_3)_2N]$
di-n-dodecylamine
$[CH_3(CH_2)_{11}]_2NH$ tri-n-dodecylamine
[CH$_3$(CH$_2$)$_{11}$]$_3$N
tricaprylyl amine
R$_3$N
where R is a mixture of C$_8$H$_{17}$ and C$_{10}$H$_{21}$ but predominantly C$_8$H$_{17}$.
tri iso-octylamine
[CH$_3$(CH$_2$)$_7$]$_3$N
where C$_8$H$_{17}$ groups are comprised of mixed isomers.
N,N-didodecyl-N-n-butylamine
(C$_4$H$_9$)(C$_{12}$H$_{23}$)$_2$N
N-dodecenyl-n-trialkylmethyl amine
(C$_{12}$H$_{23}$)(R$_1$R$_2$R$_3$C)NH
where R$_1$ + R$_2$ + R$_3$ equal C$_{11}$H$_{23}$ to C$_{14}$H$_{29}$.
N-lauryl-N-trialkylmethyl amine
(C$_{12}$H$_{26}$) (R$_1$R$_2$R$_3$C)NH
where R$_1$ + R$_2$ + R$_3$ equal C$_{11}$H$_{23}$ to C$_{14}$H$_{29}$.
tricoco amine R$_3$N
where R is a mixture of

|  | Percent |
|---|---|
| C$_8$H$_{17}$ to C$_{10}$H$_{21}$ | 15 |
| C$_{12}$H$_{25}$ | 48 |
| C$_{14}$H$_{29}$ | 18 |
| C$_{16}$H$_{33}$ | 9 |
| C$_{18}$H$_{37}$(stearyl-oleyl) | 10 | tri lauryl amine
R$_3$N
where R is a mixture of

|  | Percent |
|---|---|
| C$_{12}$H$_{26}$ | 88 |
| C$_{14}$H$_{29}$ isomers | 10 |
| C$_{10}$H$_{21}$ | 2 |

Amberlite XLA-3 amine

Amberlite XLA-3 amine is a primary amine having a molecular weight of 340–360, a specific gravity of 0.848 g./ml. and a loading capacity of 2.8 to 3.0 milliequivalents/gram Amberlite XLA-3 amine is manufactured by Rohm & Haas Company. Napoleum 470 solvent, is a high boiling hydrocarbon fraction having a specific gravity of 0.8111 g/ml., boiling point is 410° F with a flash point of 175° F. Napoleum 470 solvent is sold by Kerr-McGee Corporation.

It should be noted that the amines which are suitable for use in the instant invention are believed to function by forming amine salts with anions or anionic complexes, however, it has been found that other mechanisms probably operate since amounts of anionic materials in excess of that theoretically possible by such a salt forming mechanism can be extracted.

Although the amines are capable of extracting when in the undiluted liquid form, it is preferred that they can be utilized in conjunction with an organic diluent for greater ease in handling and extraction control. In general, organic diluents which are suitable for use in the present invention are organic solvents in which the amines are quite soluble and, in addition, are substantially water insoluble. A wide range of organic solvents are effective including kerosene, mineral spirits, naptha, benzene, xylene, toluene, nitrobenzene, carbon tetrachloride, chloroform, trichloroethylene and the like.

In some instances it is highly desirable to add minor amounts of suitable additives to increase the solubility of the amine in certain organic solvents. Additives which have been especially effective as solubilizing agents are, in general, water-insoluble alcohols which are soluble in the organic diluent and preferably are monohydric higher aliphatic alcohols containing about 6 to about 20 carbon atoms; especially preferred are the primary alcohols containing not more than 15 carbon atoms. For example, tricaprylyl amine, about 10% by total volume is rendered more soluble in kerosene by the addition of about 5% by total volume of n-decyl alcohol as an additive. Suitable alcohols include 1-hexanol, 4-methyl-2-pentanol, 2-ethyl-1-butanol, 2-heptanol, 1-octanol, 2-octanol, 5-ethyl-2-nonanol, 1-dodecanol, 1-tetradecanol and the like.

The extraction processes, as well as the back-extractions or removal processes, may be carried out in batches in which case it may be necessary to repeat the extraction until the desired advantageous degree of extraction is reached. However, the processes may be carried out in a continuous operation, with countercurrent contact of the aqueous or wet phosphoric acid phase with the extractant phase, or in any other continuous manner.

The phosphoric acid which has been extracted into the extractant phase by an amine to form an amine-P$_2$O$_5$ complex is removed from this phase by contacting this phase with sulfur dioxide and water substantially in the absence of free oxygen to form aqueous phosphoric acid and amine-sulfur dioxide reaction product.

The amounts of water and sulfur dioxide necessary for the back-extractions or removal processes vary, inter alia, on the extractant phase to be used, the concentration of the aqueous phosphoric acid desired as the end product, etc. The preferred amounts can be readily determined by conducting equilibrium distribution tests on the extractant phase and the aqueous solvent to be used in order to determine the degree of back-extraction or removal desired.

In general, the amount of extractant phase necessary to be contacted with the wet phosphoric acid is dependant on the concentration of the wet phosphoric acid, as well as the equilibrium distribution between the phosphoric acid in the aqueous phase and the phosphoric acid in the extractant phase. Because the amines vary in degree of extraction as well as being influenced by the particular organic diluent used, it should be noted that preferably only amounts of the extractant phase which are sufficient to remove the phosphoric acid should be used. The preferred amounts can be readily determined by conducting equilibrium distribution tests on the particular wet phosphoric acid as well as the particular extractant phase to be used in order to determine the degree of extraction which is desired.

As can be appreciated, a process for the production of substantially pure phosphoric acid thereof can be carried out by the utilization of the foregoing methods. A typical process can entail first removing, if necessary, organic impurities by filtration through activated carbon or other suitable means. The organic purified wet phosphoric acid can then be further purified by removing such impurities as the fluoride and sulfate impurities by using a suitable amount of an extractant phase of an amine dissolved in an organic diluent.

The resulting substantially pure phosphoric acid can be further purified with respect to organic impurities by filtration through activated carbon or other suitable means and can be concentrated by such means as evaporation. Or, if it is advantageous to do so, fluoride and sulfate-free wet phosphoric acid can be further purified by removing iron impurities, if necessary, and then extracted with a suitable amount of a free amine dissolved in an organic diluent as the extractant phase.

Following phase separation of the amine-solvent system containing extracted phosphate values from the raffinate, the amine solvent system containing the phosphate values ($P_2O_5$) is brought into contact with sulfur dioxide and water substantially in the absence of free oxygen. This results in an exchange reaction in which the phosphate values are released to water as phosphoric acid and the amine is converted to an amine-sulfur dioxide reaction product which may be sulfite or bisulfite. The concentration of the acid obtained in this exchange reaction is a function of the amount of water and $SO_2$ employed. Generally, however, it is possible to obtain acid concentration of 20 percent or more $P_2O_5$ by the practice of the process of this invention. Because of prior removal of organic and ionic impurities, the product may be water-white, of low viscosity, and can be concentrated by ordinary means to a water-white product of 80 percent $P_2O_5$, having a high polyphosphate content and containing 1 percent solids or less.

More significant, however, is the degree of concentration which may be obtained. Using the process of this invention and starting with dilute phosphoric acid solutions containing from about 1–2 percent by weight $P_2O_5$ there may be obtained, as indicated, phosphoric acid solutions containing 20 or more percent by weight $P_2O_5$. This represents about a 20-fold increase in concentration by the use of chemical systems which are readily regenerative without employing elaborate operational techniques.

The solvent system containing amine-sulfur dioxide reaction product is then treated thermally, substantially in the absence of oxygen, for recovery of both the amine-solvent system and sulfur dioxide for recycle. The preferred technique is to bring the solvent system containing the amine-sulfur dioxide reaction product in contact with steam which causes the release of sulfur dioxide and transforms the amine back to its free base form.

The amine-solvent system and the sulfur dioxide must be regenerated from the amine-sulfur dioxide reaction product in the absence of free oxygen. Similarly, the $P_2O_5$ must be stripped from the amine-$P_2O_5$ complex with sulfur dioxide substantially in the absence of free oxygen. Free oxygen oxidizes the amine-sulfur dioxide reaction product to a higher oxidation state, possibly to an amine-sulfate complex which is thermally stable and cannot be thermally regenerated into the amine-solvent system and/or sulfur dioxide. Accordingly, the presence of free oxygen, such as in air, during the $P_2O_5$ stripping step and/or the thermal regeneration causes a loss of the amine and sulfur dioxide. In the absence of oxygen, substantially all of the amine and sulfur dioxide can be recovered after stripping and can be regenerated. In contrast, in the presence of free oxygen, as much as 80% of the amine and sulfur dioxide can be lost from the formation of the thermally stable higher oxidation state product. The regeneration step will work with the amine-sulfur dioxide reaction product prepared from a primary, secondary or tertiary amine.

After regeneration, the amine-solvent system is separated from water and recycled back to the extraction step of the process. Likewise, the sulfur dioxide is recycled back to the stripping step after regeneration.

If the amine remain complexed with some of the extracted silica fluoride and sulfate values, it is, prior to return, treated with a suitable base of a strength at least equal to ammonia to remove any ionic residues which may have been extracted and carried along in the amine-solvent system.

In the practice of the process of this invention, the amine-solvent system containing phosphate values may be brought into contact with sulfur dioxide as a gas, liquid or as an aqueous sulfurous acid solution. Although extraction is preferably carried out by intimate contact with water and free sulfur dioxide, with accompanying high agitation, phosphoric acid may also be generated by simply having the amine-solvent system in interfacial contact with water and purging the amine-solvent system with sulfur dioxide.

While the process of this invention has been described in terms of the production of concentrated phosphoric acid from wet process acid and from dilute phosphoric acid obtained in the leaching of settled slimes it is also useful for the production of concentrated phosphoric acid from weak acids obtained from the leaching of low grade ores as well as in upgrading wet process acid. Florida pebble rock, for instance, is a phosphate bearing material, uneconomical to process for some purposes. Because the process of this invention effectively removes impurities which may be leached from the pebble rock valuable high purity phosphoric acid may be prepared from such low grade ores. In addition, low grade ores may be added to settled phosphate bearing slimes to upgrade the $P_2O_5$ content of the leach liquor.

EXAMPLE 1

In this example a solvent system was prepared by mixing 20 parts by volume of tricapryl amine and 110 parts by volume of a 10:1 by volume mixture of odorless mineral spirits and isodecanol. This solvent system was admixed with 65 parts by volume of aqueous wet process phosphoric acid containing impurities (analysis of the wet process phosphoric acid is given in the chart below). The system was agitated to cause intimate admixture of the solvent system and the phosphoric acid. Thereafter it was allowed to separate into an organic phase and an aqueous phase.

Two liters of the above organic phase were obtained. 500 ml of this organic phase were admixed with 250 ml of distilled water, while agitating the admixture and bubbling 14 cc per minute of technical grade sulfur dioxide through the admixture for three minutes in the absence of air. The sulfur dioxide treated admixture was then allowed to separate into an organic phase and an aqueous phase and the aqueous phase was advanced for contact with another 500 ml organic and $SO_2$ in the absence of air. After four portions of the organic were used the final aqueous phase was analyzed and the results of the analysis are shown in the following table:

Table A

| | Original wet process phosphoric acid | Purified acid |
|---|---|---|
| $P_2O_5$ | 28.7 % by wt. | 21.0 % by wt. |
| MgO | .33 | .012 |

Table A-continued

|  | Original wet process phosphoric acid | Purified acid |
|---|---|---|
| CaO | .19 | .007 |
| $Al_2O_3$ | .84 | .01 |
| $Fe_2O_3$ | .87 | .20 |

250 ml of water was converted to steam at a pressure of about 1 atm. and the steam was passed through the sulfur dioxide treated solvent system which system was maintained at a temperature of about 212° F and the sulfur dioxide was released from the system and collected and tricapryl amine was regenerated. The regeneration step was conducted in the absence of oxygen. At the end of the sulfur dioxide stripping the solvent system was analyzed and found to contain 0.06% by weight of sulfur dioxide, 2.1% by weight of $P_2O_5$ values.

EXAMPLE 2

This example is given to illustrate an actual working practice of a continuous process employing the teachings of this invention. In this example three separate countercurrent extraction stages labelled A, B and C were employed, each stage consisting of two vessels, a first phase contact vessel for separately introducing at the lower portion of the vessel an aqueous phase and amine-solvent phase, with stirring means provided to ensure intimate contact between the phases to permit extraction. The admixed phases were removed through the upper portion of the vessel and transferred into a separation vessel wherein the phases were allowed to separate with means being provided for separately removing the separated phases. The volume of the liquid in the mixing vessel being approximately 250 ml and the volume of the liquid in the separation vessel being 750 ml. The input and output of the liquids into and out of the vessels being maintained equal such that there was an overall continuous even flow of materials both from vessel to vessel and stage to stage.

An amine-solvent system composed of 20% by volume tricapryl amine and 80% by volume organic diluent, said diluent being composed of 7 parts by volume of odorless mineral spirits and 1 part by volume of isodecanol (Isodecanol was found useful in promoting the stability of a two-phase liquid system) was fed at the rate of 36 ml per minute into the mixing vessel of Stage A while about 30% $P_2O_5$ content wet process phosphoric acid was fed at a rate of 7.2 ml per minute into the mixing vessel of Stage C. The course of the amine-containing solvent system through the extraction stages was that it entered through the mixing vessel of Stage A, passed through the separation vessel of Stage A and sequentially was passed through Stages B and C in the same manner and was collected for processing in the back extraction stages. The course of the wet process phosphoric acid through the extraction stages was that it entered through the mixing vessel of Stage C passed through the separation vessel of Stage C and sequentially was passed through Stages B and A and thereafter was collected for analysis and further processing.

The amine-solvent system which was loaded with $P_2O_5$ values from the extraction stages was passed through a two-stage back extraction system (Stage D and Stage E) where it was contacted countercurrently with distilled water and gaseous sulfur dioxide. The setup and feeding mechanisms in the back extraction stages were essentially similar to those used in the extraction stages except that there was provided means for introducing technical grade sulfur dioxide at 1.5 gram per minute into each of the mixing vessels. The loaded amine solvent was passed from Stage D to E and the amine solvent which had been back extracted, had the bulk of $P_2O_5$ values removed therefrom. The distilled water was fed at 4 ml per minute in Stage E through D where it was separately recovered for analysis. The loaded amine-solvent system was passed into the back extraction stages at the same rate that it was flowing through the extraction stages.

The amine-solvent system having passed through the back extraction stages was passed into a one-inch (inside diameter) Oldershaw distillation column having 10 perforated plates. The amine-solvent system was introduced between the 8th and 9th plate (counting up from the bottom plate) and allowed to fall by gravity down through the plates to a bottom collecting vessel while steam at atmospheric pressure was passed up through the column, stripping the sulfur dioxide from the amine-sulfur dioxide reaction product while the regenerated amine solvent passed downwardly therethrough. The Older-shaw column was fitted with a condenser and operated at total reflux. The regeneration was conducted in substantial absence of oxygen.

An analysis of the stripped amine-solvent system showed that it contained a low, non-detectable level of sulfur dioxide and 0.1 to about 5 grams per liter of $P_2O_5$ values.

The following table gives an analysis of the impure wet process phosphoric acid as it entered the system and analysis of the aqueous phosphoric acid as it was collected after it had been back extracted from the amine-solvent system.

Table B

|  | Original wet process phosphoric acid | Purified Acid |
|---|---|---|
| $P_2O_5$ | 28.7 % by wt. | 30.4 % by wt. |
| MgO | .19 | .016 |
| CaO | .15 | .010 |
| $Al_2O_3$ | 1.07 | .08 |
| $Fe_2O_3$ | .85 | .44 |
| $SiO_2$ | 1.50 | .12 |
| $SO_4^=$ | 3.36 | .16 |
| $F^-$ | 2.8 | .19 |

The continuous system disclosed in this example was operated for 96 hours and periodic analysis of the purified phosphoric acid showed that the system produced acid having a purity as shown in Table B throughout its operation. Hence, it is obvious to anyone skilled in the art that this invention as shown by this example provides an efficient economical process for the purification of phosphoric acid.

The above $P_2O_5$ stripping step with sulfur dioxide and the amine and sulfur dioxide regeneration steps were conducted in the absence of air.

EXAMPLE 3

A solvent system was prepared using AMBERLITE XLA-3 a primary amine (20 parts by volume) and diluted with 70 parts by volume of odorless mineral spirits and 10 parts by volume of isodecanol. The amine-solvent system was used to extract phosphoric acid in a countercurrent mixer-settler system. The loaded amine was then stripped in a two-stage airtight mixer-settler using water and an excess sulfur dioxide and an organic to aqueous ratio of 16:1. The stripping was conducted substantially in the absence of oxygen. After the stripping operation was completed, the organic phase, containing amine-sulfur dioxide reaction product, and the aqueous phase were allowed to separate. The organic phase now loaded with $SO_2$ was passed downward through a perforated plate column as steam was passed up through the organic on the column plates. The $SO_2$ was stripped overhead and the solvent system was continuously withdrawn from the column bottom. The regeneration step was conducted substantially in the absence of oxygen. It was found that there was no detectable $SO_2$ left in the solvent system and substantially all the amine was regenerated from the amine-sulfur dioxide reaction product.

EXAMPLE 4

This example will illustrate the necessity of air exclusion during stripping of $SO_2$ from the amine-solvent system.

A solution of primary amine, AMBERLITE XLA-3, 10% by weight in odorless mineral spirits was treated at ambient temperature with a mixture of $SO_2$, air and water. It was found that over 80% of the $SO_2$ was oxidized to form $(RNH_3^+)_2\ SO_4^{--}$ or $RNH_3^+\ HSO_4^-$. In attempting to steam strip the loaded solvent system to regenerate $SO_2$ and free amine in accordance with Example 3, it was found that only 10% of the amine could be regenerated.

EXAMPLE 5

This example is presented solely to demonstrate the steam stripping of $SO_2$ from a primary amine AMBERLITE XLA-3 as a 10% solution in an organic diluent, Napoleum 470 (Kerr McGee Corporation) was loaded with sulfurous acid. The amine-solvent system was heated with an equal volume of water in the absence of air and oxygen. The $SO_2$ was driven off and measured. The $SO_2$ remaining in the solvent system as a function of temperature is shown in the following table.

$SO_2$ (%) REMOVED V. STRIPPING TEMPERATURE (C °)

| Temperature | $SO_2$ Removed (%) |
|---|---|
| 26 | 0 |
| 68 | 53 |
| 77 | 63 |
| 81 | 76 |
| 83 | 82 |
| 86 | 89 |
| 88 | 92.5 |
| 100 | 98 |

What is claimed is:

1. In a method of purifying phosphoric acid by removing the phosphoric acid values from the aqueous phase which contains impurities, said process comprising the following steps: extracting the phosphoric acid with a water insoluble extractant phase comprised of a water-immiscible amine dissolved in an organic diluent, said extractant phase being used in amounts sufficient to extract said phosphoric acid from the aqueous phase; separating the water insoluble extractant phase from the aqueous phase containing impurities; stripping the phosphoric acid values from the extractant phase by contacting the extractant phase with sulfur dioxide and water to cause the phosphoric acid values in said extractant phase to be released into the water to form a purified aqueous phosphoric acid and to form an amine-sulfur dioxide reaction product soluble in said extractant phase; separating the aqueous phosphoric acid from the extractant phase; and thermally regenerating the water immiscible amine and the sulfur dioxide from the amine-sulfur dioxide reaction product in the extractant phase; the improvement comprising the steps of:
1. stripping the phosphoric acid from the extractant with sulfur dioxide and water substantially in the absence of free oxygen;
2. separating the phosphoric acid solution from the water immiscible extractant phase substantially in the absence of free oxygen; and
3. thermally regenerating the water immiscible amine and the sulfur dioxide reaction product in the extractant phase by heating said extractant phase substantially in the absence of free oxygen.

2. The process as claimed in claim 1 in which the water immiscible amine is selected from the group consisting of a primary, a secondary and a tertiary aliphatic amine.

3. The process as claimed in claim 1 in which the water immiscible amine is a primary aliphatic amine; the hydrocarbon moiety of said amine contains from about 7 to about 25 carbon atoms.

4. The process as claimed in claim 1 in which the water immiscible primary aliphatic amine is octadecylamine.

5. The process as claimed in claim 1 in which the water immiscible amine is a secondary aliphatic amine; the hydrocarbon moieties of said secondary amine contains from about 4 to about 18 carbon atoms.

6. The process as claimed in claim 1 in which the water immiscible secondary amine is di-n-nonylamine.

7. The process as claimed in claim 1 in which the water immiscible amine is an aliphatic tertiary amine; the hydrocarbon moieties of said tertiary amine contains from about 7 to about 15 carbon atoms.

8. The process as claimed in claim 1 in which the water immiscible tertiary amine is tri-n-octylamine.

9. The process as claimed in claim 1 in which the water immiscible amine is selected from the group consisting of a primary and a secondary aromatic amine.

10. The process of claim 1 wherein said amine-sulfur dioxide reaction product is thermally regenerated by contacting said product with steam.

11. The process of claim 10 wherein said amine is tricapryl amine.

12. The process as claimed in claim 1 in which the amine-solvent system contains from 5 to 35 percent by volume amine.

13. The process as claimed in claim 1 in which the amine-solvent system contains about 20 percent by volume amine.

14. The process as claimed in claim 1 wherein said amine-sulfur dioxide reaction product is thermally regenerated by contacting said phase with a heated non-oxidizing gas.

15. The process as claimed in claim 1 wherein the extractant is employed to recover and purify phosphoric acid from dilute phosphoric acid solutions.

16. The process as claimed in claim 15 wherein phosphate slimes are digested to form the dilute phosphoric acid solution.

17. The process as claimed in claim 15 wherein low grade phosphate ore is digested to form the dilute phosphoric acid solution.

18. The process as claimed in claim 15 wherein waste streams containing phosphoric acid are employed as the source of the dilute phosphoric acid solution.

19. The process as claimed in claim 1 wherein the regenerated water-immiscible amine is recycled to the extraction step.

20. The process as claimed in claim 1 wherein the regenerated sulfur dioxide is recycled to the stripping step.

* * * * *